United States Patent
Battisti

(10) Patent No.: US 8,398,368 B2
(45) Date of Patent: Mar. 19, 2013

(54) METHOD FOR IMPLEMENTING WIND ENERGY CONVERTING SYSTEMS

(75) Inventor: Lorenzo Battisti, Trento (IT)

(73) Assignee: S.I.SV.EL S.p.A. Societa Italiana per lo Sviluppo dell' Elettronica (IT)

(*) Notice: Subject to any disclaimer, the term of this patent is extended or adjusted under 35 U.S.C. 154(b) by 753 days.

(21) Appl. No.: 12/303,068

(22) PCT Filed: May 29, 2007

(86) PCT No.: PCT/IB2007/001403
§ 371 (c)(1),
(2), (4) Date: Sep. 29, 2009

(87) PCT Pub. No.: WO2007/138452
PCT Pub. Date: Dec. 6, 2007

(65) Prior Publication Data
US 2010/0034652 A1    Feb. 11, 2010

(30) Foreign Application Priority Data
May 31, 2006    (IT) ............................... TO2006A0401

(51) Int. Cl.
*F03D 1/00*    (2006.01)
(52) U.S. Cl. ............................................. 416/1; 416/39
(58) Field of Classification Search .................... 415/17, 415/47, 48, 115, 116; 416/37, 39, 90 R, 416/1
See application file for complete search history.

(56) References Cited

U.S. PATENT DOCUMENTS

| | | | | |
|---|---|---|---|---|
| 5,874,672 A * | 2/1999 | Gerardi et al. | ............ | 73/170.26 |
| 6,145,787 A * | 11/2000 | Rolls | ......................... | 244/134 R |
| 6,347,767 B1 * | 2/2002 | Holmen | ...................... | 244/134 F |
| 6,612,810 B1 * | 9/2003 | Olsen et al. | ...................... | 416/95 |
| 6,890,152 B1 * | 5/2005 | Thisted | ............................. | 416/1 |
| 7,217,091 B2 * | 5/2007 | LeMieux | ........................ | 416/95 |
| 7,637,715 B2 * | 12/2009 | Battisti | ......................... | 415/115 |
| 2005/0242233 A1 * | 11/2005 | Battisti | .......................... | 244/58 |

(Continued)

FOREIGN PATENT DOCUMENTS

| | | |
|---|---|---|
| DE | 196 21 485 A1 | 3/1998 |
| EP | 1 748 185 A1 | 1/2007 |

(Continued)

OTHER PUBLICATIONS

Cao, H.V. and Wentz, W.H. Jr. "Performance and Aerodynamic Braking of a Horizontal-Axis Wind Turbine from Small-Scale Wind Tunnel Tests". Jul. 1987.*
Seifert, Henry and Richert, Frank. "A Recipe to Estimate Aerodynamics and Loads on Iced Rotor Blades". Paper presented at Boreas IV, Mar. 1998.*

*Primary Examiner* — Edward Look
*Assistant Examiner* — Christopher R Legendre
(74) *Attorney, Agent, or Firm* — Cesari and McKenna, LLP

(57) ABSTRACT

Wind Energy Converting Systems (WECS) fitted with anti-icing systems are made by using the method according to the invention in the following steps:
a) prearranging a wind rotor with blades (5), an anti-icing system, and means (50, 51) for adjusting the anti-icing system;
b) installing the prearranged rotor of the WECS on a test site;
c) carrying out at least one operation test of the WECS;
d) detecting parameters useful for determining the presence or absence of ice on the outer surface (5E) of the blades (5).
If the detected parameters do not meet a predetermined target function, the method comprises additional steps of:
e) performing an adjustment through said adjustment means (50, 51); repeating the previous steps from c) to e) until no ice is detected on the outer surface (5E) of the blades (5).

16 Claims, 7 Drawing Sheets

U.S. PATENT DOCUMENTS

| | | |
|---|---|---|
| 2005/0276696 A1 | 12/2005 | LeMieux |
| 2007/0154310 A1 | 7/2007 | Wobben |
| 2010/0034652 A1* | 2/2010 | Battisti .......................... 416/39 |
| 2010/0158688 A1* | 6/2010 | Benito et al. ................... 416/39 |

FOREIGN PATENT DOCUMENTS

| | | |
|---|---|---|
| WO | WO 2004-036038 A1 | 4/2004 |
| WO | WO 2004-104412 A1 | 12/2004 |

* cited by examiner

MASTER blade - RESULT OF LEVEL 2 PROCESS

| Stazione | r/R | Vacuum side ||||||||||||| Pressure side |||||||||||| ΔR |
|---|---|---|---|---|---|---|---|---|---|---|---|---|---|---|---|---|---|---|---|---|---|---|---|---|---|---|
| | | 0,7 | 0,65 | 0,6 | 0,55 | 0,5 | 0,45 | 0,4 | 0,35 | 0,3 | 0,25 | 0,2 | 0,15 | 0,1 | 0,05 | -0,05 | -0,1 | -0,15 | -0,2 | -0,25 | -0,3 | -0,35 | -0,4 | -0,45 | -0,5 | -0,55 | |
| 180 | 1 | | | | | | | | | | o o | o | o o | o o | o o | o o | o | | | | | | | | | | 0,15 |
| 179 | 0,995 | | | | | | | | o | o o | o o | o o | o o | o o | o o | o o | o | | | | | | | | | | 0,15 |
| 178 | 0,990 | | | | | | | | o | o o | o o | o o | o o | o o | o o | o o | o | | | | | | | | | | 0,15 |
| 177 | 0,895 | | | | | | | | o | o o | o o | o o | o o | o o | o o | o o | o | | | | | | | | | | 0,15 |
| 176 | 0,890 | | | | | | | | o | o o | o o | o o | o o | o o | o o | o o | o | | | | | | | | | | 0,15 |
| 175 | 0,885 | | | | | | | | o | o o | o o | o o | o o | o o | o o | o o | o | | | | | | | | | | 0,15 |
| 174 | 0,880 | | | | | | | | o | o o | o o | o o | o o | o o | o o | o o | o | | | | | | | | | | 0,15 |
| 101 | 0,605 | | | | | | | | | | o o | o o | o o | o o | o o | o o | o | | | | | | | | | | 0,15 |
| 100 | 0,60 | | | | | | | | | | o o | o o | o o | o o | o o | o o | o | | | | | | | | | | 0,15 |
| 82 | 0,51 | | | | | | | | | | o o | o o | o o | o o | o o | o o | o | | | | | | | | | | 0,15 |
| 81 | 0,505 | | | | | | | | | | o o | o o | o o | o o | o o | o o | o | | | | | | | | | | 0,15 |
| 80 | 0,5 | | | | | | | | | | o o | o o | o o | o o | o o | o o | o | | | | | | | | | | 0,15 |

Fig.9

MASTER blade - RESULT OF LEVEL 3 PROCESS

| Stazione | r/R | Vacuum side 0,7 | 0,65 | 0,6 | 0,55 | 0,5 | 0,45 | 0,4 | 0,35 | 0,3 | 0,25 | 0,2 | 0,15 | 0,1 | 0,05 | Pressure side -0,05 | -0,1 | -0,15 | -0,2 | -0,25 | -0,3 | -0,35 | -0,4 | -0,45 | -0,5 | -0,55 | ΔR |
|---|---|---|---|---|---|---|---|---|---|---|---|---|---|---|---|---|---|---|---|---|---|---|---|---|---|---|---|
| 180 | 1 | | | | | | | | | ○ | ○ | ○ | ○ | ○ | | ○ | ○ | | | | | | | | | | 0,15 |
| 179 | 0,995 | | | | | | | | ○ | ○ | ○ | ○ | ○ | ○ | ○ | ○ | ○ | ○ | | | | | | | | | 0,15 |
| 178 | 0,990 | | | | | | | | ○ | ○ | ○ | ○ | ○ | ○ | ○ | ○ | ○ | ○ | | | | | | | | | 0,15 |
| 177 | 0,895 | | | | | | | | ○ | ○ | ○ | ○ | ○ | ○ | ○ | ○ | ○ | ○ | | | | | | | | | 0,15 |
| 176 | 0,890 | | | | | | | | ○ | ○ | ○ | ○ | ○ | ○ | ○ | ○ | ○ | ○ | | | | | | | | | 0,15 |
| 175 | 0,885 | | | | | | | | ○ | ○ | ○ | ○ | ○ | ○ | ○ | ○ | ○ | ○ | | | | | | | | | 0,15 |
| 174 | 0,880 | | | | | | | | ○ | ○ | ○ | ○ | ○ | ○ | ○ | ○ | ○ | ○ | | | | | | | | | 0,15 |
| 101 | 0,605 | | | | | | | | | | ○ | ○ | ○ | ○ | ○ | ○ | ○ | ○ | | | | | | | | | 0,15 |
| 100 | 0,60 | | | | | | | | | | ● | ● | ● | ● | ● | ● | ● | ● | | | | | | | | | 0,15 |
| 82 | 0,51 | | | | | | | | | | ● | ● | ● | ● | ● | ● | ● | ● | ● | | | | | | | | 0,15 |
| 81 | 0,505 | | | | | | | | | | ● | ● | ● | ● | ● | ● | ● | ● | ● | | | | | | | | 0,15 |
| 80 | 0,5 | | | | | | | | | | ● | ● | ● | ● | ● | ● | ● | ● | ● | | | | | | | | 0,15 |

Fig.7

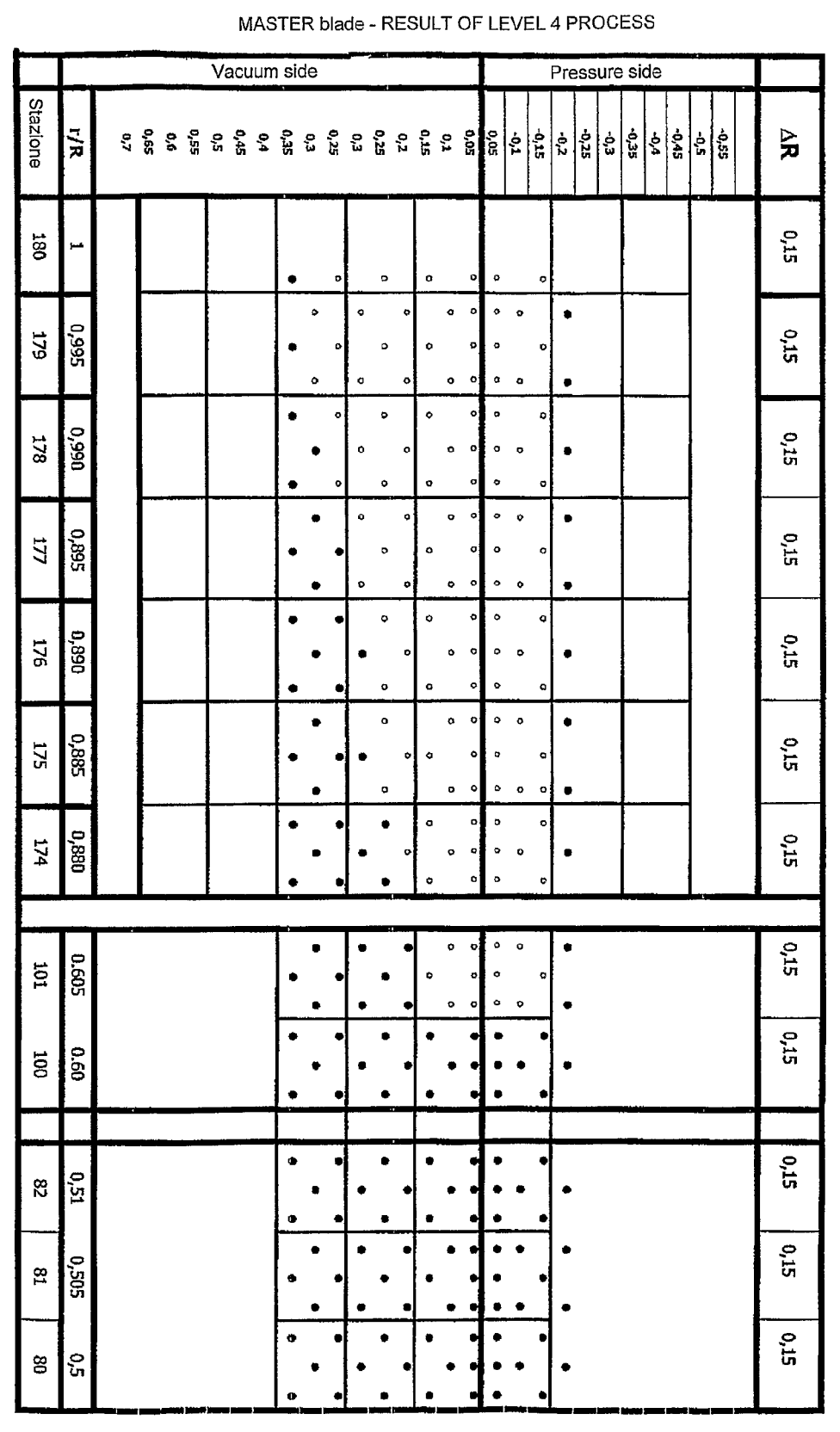

MASTER blade - RESULT OF LEVEL 4 PROCESS

| Stazione | r/R | Vacuum side | | | | | | | | | | | | | Pressure side | | | | | | | | | | | ΔR |
|---|---|---|---|---|---|---|---|---|---|---|---|---|---|---|---|---|---|---|---|---|---|---|---|---|---|---|
| | | 0,7 | 0,65 | 0,6 | 0,55 | 0,5 | 0,45 | 0,4 | 0,35 | 0,3 | 0,25 | 0,2 | 0,15 | 0,1 | 0,05 | -0,05 | -0,1 | -0,15 | -0,2 | -0,25 | -0,3 | -0,35 | -0,4 | -0,45 | -0,5 | -0,55 | |
| 180 | 1 | | | | | | | | | • | ○ | ○ | ○ | | ○ | ○ | ○ | | | | | | | | | | 0,15 |
| 179 | 0,995 | | | | | | | | • | ○ | ○ | ○ | ○ | ○ | ○ | ○ | ○ | • | | | | | | | | | 0,15 |
| 178 | 0,990 | | | | | | | | • | ○ | ○ | ○ | ○ | ○ | ○ | ○ | ○ | • | | | | | | | | | 0,15 |
| 177 | 0,895 | | | | | | | | • | ○ | ○ | ○ | ○ | ○ | ○ | ○ | ○ | • | | | | | | | | | 0,15 |
| 176 | 0,890 | | | | | | | | • | • | ○ | ○ | ○ | ○ | ○ | ○ | ○ | • | | | | | | | | | 0,15 |
| 175 | 0,885 | | | | | | | | • | • | • | ○ | ○ | ○ | ○ | ○ | ○ | • | | | | | | | | | 0,15 |
| 174 | 0,880 | | | | | | | | • | • | • | ○ | ○ | ○ | ○ | ○ | • | | | | | | | | | | 0,15 |
| 101 | 0,605 | | | | | | | | | • | • | • | ○ | ○ | ○ | ○ | ○ | • | | | | | | | | | 0,15 |
| 100 | 0,60 | | | | | | | | | • | • | • | • | • | • | • | | | | | | | | | | | 0,15 |
| 82 | 0,51 | | | | | | | | | • | • | • | • | • | • | • | | | | | | | | | | | 0,15 |
| 81 | 0,505 | | | | | | | | | • | • | • | • | • | • | • | | | | | | | | | | | 0,15 |
| 80 | 0,5 | | | | | | | | | • | • | • | • | • | • | • | | | | | | | | | | | 0,15 |

Fig.8

| Parameter | Value | Unit |
|---|---|---|
| Design parameters of the anti-icing system | | |
| Number of rows of holes | Station 179-180 → S.P.<br>Station 179-180 → S.D. | |
| | Station 178 → S.P.<br>Station 178 → S.D. | |
| | Station 177 → S.P.<br>Station 177 → S.D. | |
| | Station 174-176 → S.P.<br>Station 174-176 → S.D. | |
| | Station 102-174 → S.P.<br>Station 102-174 → S.D. | |
| | Station 101 → S.P.<br>Station 101 → S.D. | |
| Total number of holes | 26 (179-180)+21(178)+17(177)+32(174-176)+<br>936(102-174)+12(101)=1044 | |
| Hole start radial station | 101 | -- |
| Hole diameter | 0,01 | m |
| Spacing relations along the radius | 0,1 | m |
| Spacing relations along the curvilinear coordinate | 0,1 | m |
| Main heating air flow rate/blade | 0,7 | kg/s |
| Main heating air pressure | 102000 | Pa |
| Main heating air temperature | 310 | K |

Fig. 9

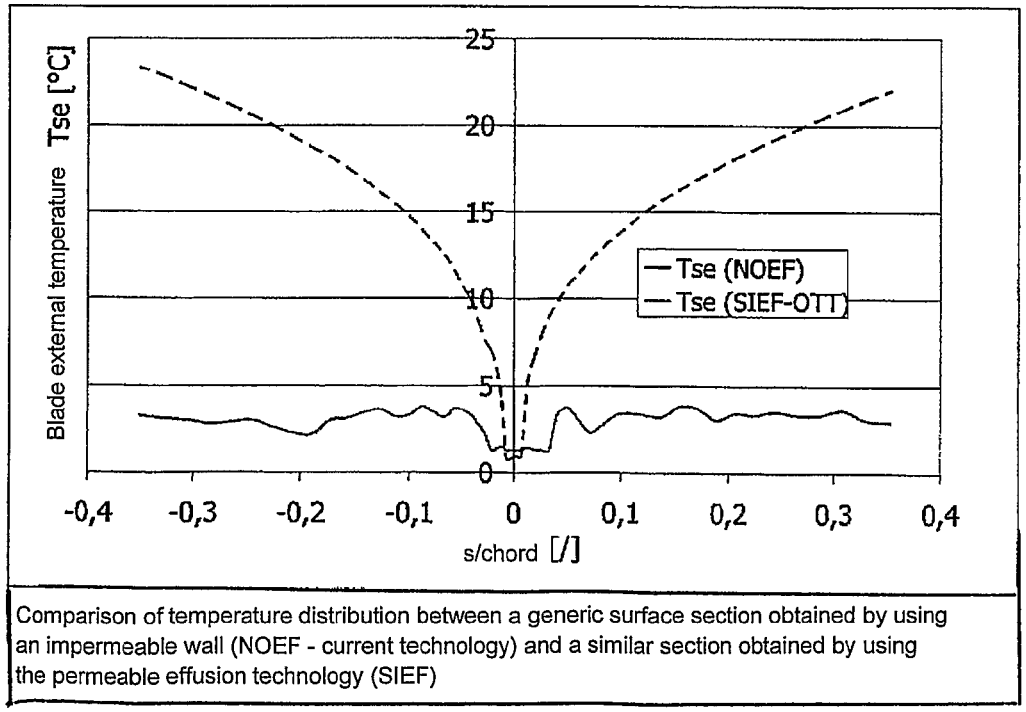

Comparison of temperature distribution between a generic surface section obtained by using an impermeable wall (NOEF - current technology) and a similar section obtained by using the permeable effusion technology (SIEF)

Fig. 10

METHOD FOR IMPLEMENTING WIND ENERGY CONVERTING SYSTEMS

BACKGROUND OF THE INVENTION

The present invention relates to a method for implementing Wind Energy Converting Systems (WECS in the following) fitted with anti-icing systems, in accordance with the installation sites where they are meant to operate for producing mechanical work or electric energy.

The present invention also relates to means for implementing said method, to rotor blades fitted with said means, and to a computer program product which can be loaded in the memory of at least one computer and which comprises portions of a computer program for executing at least a portion of said method.

The aforesaid method is particularly suited to being applied to WECS provided with an anti-icing system, as described in the international patent application WO 2004/036038, being equivalent to the Italian patent application No. TO 2002A000908 in the name of the same Applicant of the present application.

For the sake of brevity, the contents of said international and Italian applications are intended to be incorporated in the present description, and the published document should be referred to for further details.

It is however opportune to specify that, in the following description and in the appended claims, the term "anti-icing system" indicates any system that generates a so-called "de-icing" and/or "anti-icing" effect on the surface of a wind rotor blade through effusion of a fluid flow inside the blade itself.

This fluid flow runs through a plurality of holes obtained on at least a portion of the blade surface, which holes are so shaped, numerous, and have such a surface density as to create a fluid cushion, in particular an air cushion effusing from the blade and being adapted to interact with the fluid flow which impacts upon the blade surface.

The "anti-icing" effect has the purpose of preventing ice from forming and growing on the blade surface, whereas the "de-icing" effect is used for removing ice already formed on the blade.

Anti-icing devices may be a key factor for the economic tenability of WECS, in particular when they are installed on sites having unfavourable climates, i.e. where icing occurrences on the blades are high, for example sites where there is air at high degree of humidity and temperatures near to 0° C.

Icing occurrence on wind turbines blades depends on many factors, defined by those skilled in the art as "problem variables", the most important ones being: site or environmental variables, machine variables, and mixed variables.

Site or environmental variables can be subdivided into:
climatic variables, such as typical wind speed on the installation site, ambient pressure and temperature, and
weather variables, such as relative humidity, water content per volume unit, and mean diameter related to drops forming a cloud in proximity to wind turbine.

Machine variables are typically the temperature of the outer surfaces of the machine while operating and in idle conditions, the geometric parameters of the blade, and the functional parameters of the WECS, among which rated power and power reserved for the anti-icing system.

Mixed variables are those variables which derive from the interaction between the machine and the site, such as, for example, the coefficients of the external thermal exchange occurring on the outer surfaces of the WECS, water pick-up efficiency and water collection efficiency on the same surfaces.

Site or environmental variables depend only on the typology of the site where the WECS is installed.

Machine variables determine geometrical characteristics, such as typologies and parameters of blade and rotor profiles, as well as functional characteristics, such as revolution speed, rated power, power control and management protocols.

Mixed variables depend on both site parameters and machine parameters: the most important ones are the Reynolds number, the characteristics of the anti-icing system, and the generation and control of the thermal power to be supplied to the system. As a matter of facts, the high number of variables involved makes it very difficult to design and manufacture a WECS fitted with a "de-icing" and/or "anti-icing" system, independently of the specific anti-icing and/or de-icing system as applied.

The design and calculation complexity of models simulating the operating conditions of a WECS mostly emerges when calculating the installed power, the absorbed energy and the control of the anti-icing system, the aspects thereof typically lead to poor efficiency of the adopted solutions. This is due to the fact that icing occurs on the rotor blades differently according to changes in weather conditions and in the revolution speeds of the WECS rotor, or to changes in the power control strategy of the system in terms of active control, e.g. the active or passive stall of the various profiles of the blade.

An objective design problem is to determine, in a reliable manner, the power of the anti-icing system to be installed and those regions of the blade surface where said power is to be made available, which regions are very difficult to identify. As a matter of facts, experience has shown that power calculations obtained with known systems are not enough reliable and lead to considerable inefficiency.

The above described problems represent a clear limit in dimensioning anti-icing and de-icing systems as to their capacity to adapt to different installation sites of the WECS, i.e. to different weather and operating conditions of the WECS. As far as the applicant knows, the prior art does not provide any known method for implementing a WECS fitted with an anti-icing and de-icing system in accordance with the specific environmental conditions of the site where it is intended to operate.

In practice, a WECS is engineered by sizing the anti-icing system according to general empirical parameters. For example, when designing the anti-icing and de-icing system, it is customary to perform a general empirical calculation in order to calculate the thermal power to be subtracted from the generator and supplied to the anti-icing and de-icing system. Such power is typically determined based on the experience of the WECS' supplier, without actually checking any further.

No verification is therefore made before a WECS fitted with an anti-icing and de-icing system is installed, so that its efficiency is evaluated only during its normal operation, i.e. after designing, delivery, and the completed on-site installation of the WECS.

It is also known that companies specialized in WECS designing seldom manufacture rotors and rotor blades themselves, which are calculated and sized according to standard construction and aerodynamic parameters. The anti-icing and de-icing system, when used, is generally installed after blades manufacturing; only in rare cases it is installed in parallel with the blades construction.

For example, there are conventional anti-icing and de-icing systems based on the use of electric resistances associated with a portion of the outer surfaces of the rotor blades, which are applied to the outermost blade layer only in a limited region, such as the one across the leading edge, typically for a variable length; this solution provides a low-efficiency of the system.

SUMMARY OF THE INVENTION

The present invention aims at overcoming the above mentioned prior-art drawbacks by providing a new method for implementing WECS fitted with anti-icing and de-icing systems in accordance with the respective installation sites; to this aim, the invention also provides rotor blades adapted to implement said method, as well as a computer program product which can be loaded in the memory of at least one computer, which comprises portions of a program for executing at least a portion of said method.

In this frame, it is an object of the present invention to provide a method for implementing WECS fitted with anti-icing and de-icing systems which can be implemented easily and which require a relatively short implementation time.

It is another object to provide rotor blades which can be adapted easily to the requirements of the site where the WECS is installed, and the configuration thereof can be easily, effectively and quickly changed while still preserving a profile having good aerodynamic efficiency.

It is a further object to greatly increase the number of days the WECS can continuously operate in a year, thus avoiding WECS shut-offs due solely to icing or impending icing on the blades.

It is another object to ensure a high level of efficiency of the WECS in critical operating conditions.

It is another object of the invention to obtain the above objects in a simple, practical, inexpensive and efficient manner.

Said objects are achieved by means of a method for implementing WECS, of a rotor blades of a WECS, and of a computer program product which can be loaded in the memory of at least one computer, having the features as set out in the appended claims.

BRIEF DESCRIPTION OF THE DRAWINGS

Further objects, features and advantages of the present invention will become apparent from the following detailed description and from the annexed drawings, which are supplied by way of non-limiting examples, wherein:

FIGS. 6-8 are diagrams showing different rotor blade configurations according to three different implementation stages of a software applicable to an anti-icing and de-icing system for WECS;

FIG. 9 shows an example of output parameters produced by the calculation code of FIG. 5;

FIG. 10 shows a summary graphic which compares the surface temperature distribution on a generic section of an impermeable-wall blade with that obtained on a similar section of a blade fabricated by using the effusion technology.

DESCRIPTION OF A PREFERRED EMBODIMENT

Figure 1:
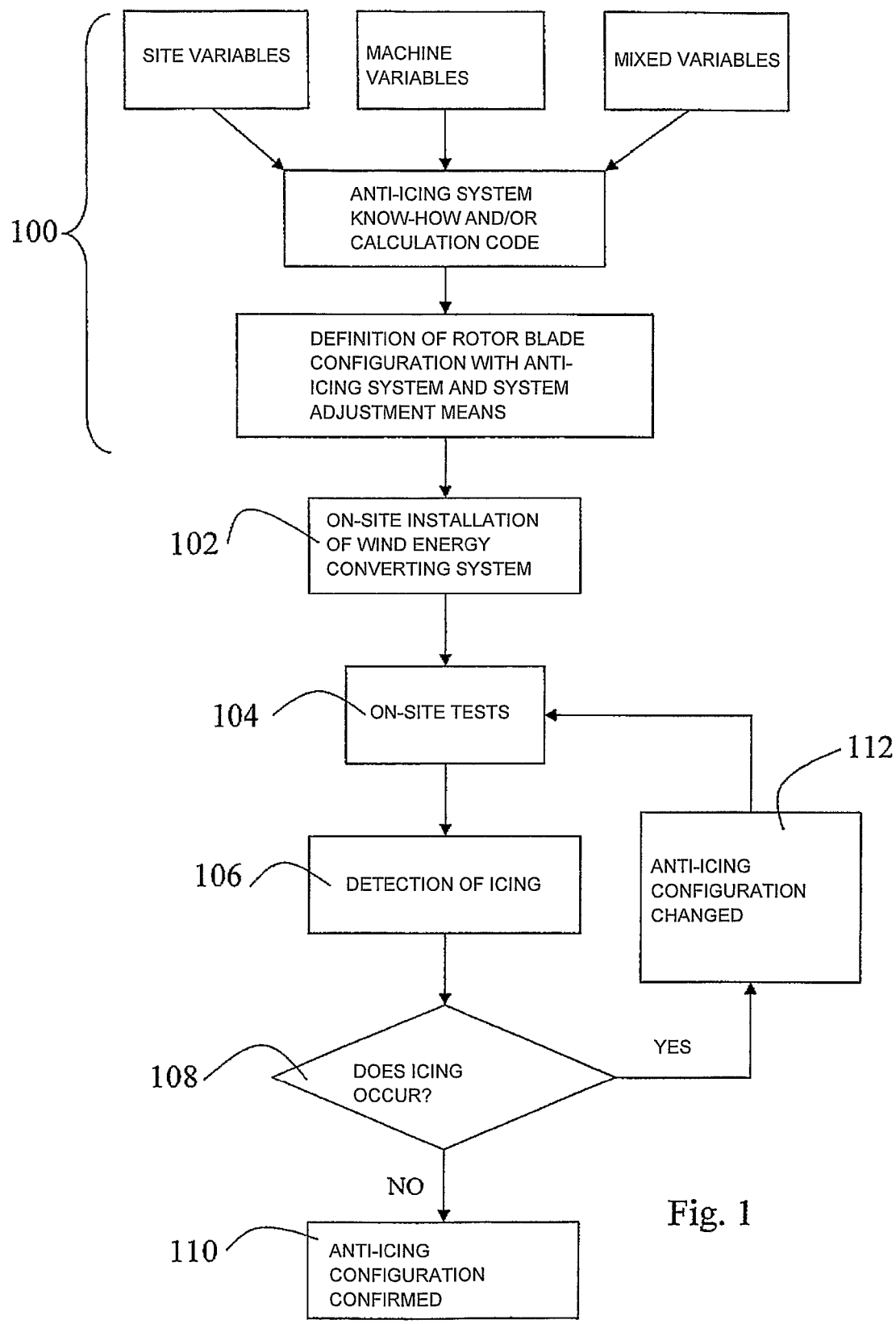
FIG. 1 shows a flow chart of a method for implementing a WECS fitted with any anti-icing and de-icing system according to the present invention.

FIG. 1 shows a flow chart relating to a method for implementing WECS fitted with an anti-icing and de-icing system in accordance with the respective installation sites.

Said method is based on the following steps:

a) pre-arranging a wind rotor comprising blades, an anti-icing system, means for adjusting the anti-icing system (step 100);

b) installing the pre-arranged wind rotor on a test site (step 102);

c) carrying out at least one operation test of the wind rotor, preferably in critical icing conditions for the location where the WECS is to be installed (step 104);

d) detecting parameters useful for determining the presence or absence of ice on the blades and/or for establishing the phenomenology under examination, such as temperature and humidity on the blade surface (step 106), through sensors known in the art;

e) adjusting the anti-icing system by means of its adjustment means (step 112), if ice is detected (step 108);

f) repeating the previous steps 104, 106, 108 and 112 until parameters are detected which indicate that no ice is present on the blade surfaces as installed on the test site (step 110).

The above-defined method advantageously allows to obtain a configuration of the WECS which is appropriate for the specific characteristics of the site where the system is intended to operate, in particular thanks to the adjustment of the anti-icing system.

For a better understanding of the above-described flow chart, below is described a practical example applied to a WECS fitted with an anti-icing system as the one described in the international application WO 2004/036038, as above already referred to.

Such an anti-icing system generates a "de-icing" and "anti-icing" effect on the surface of a blade of a wind rotor through effusion of a fluid flow, which runs inside the blade itself and comes out through a plurality of holes obtained in at least a portion of the outer surface of the blade.

The holes are so shaped and distributed that the air flowing out thereof creates a fluid cushion adapted to interact with the air flow impacting upon the surface of said blade.

Figure 3:
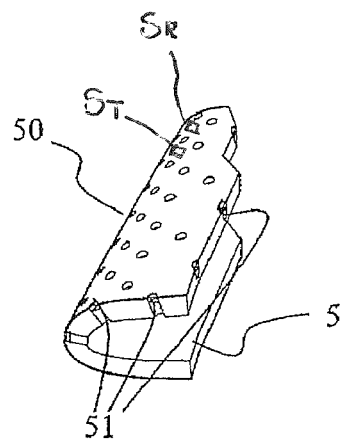
FIGS. 3 and 4 show an enlarged perspective view of a section of the leading edge of the blade, including engaging elements adapted to implement the method according to the invention, and a perspective view of said engaging elements, respectively.
Figure 4:
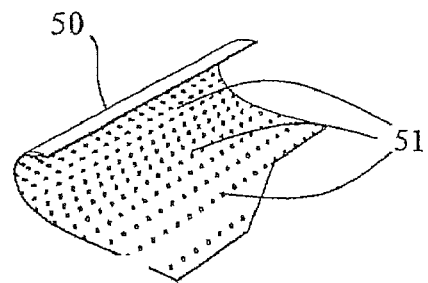
Figure 2:
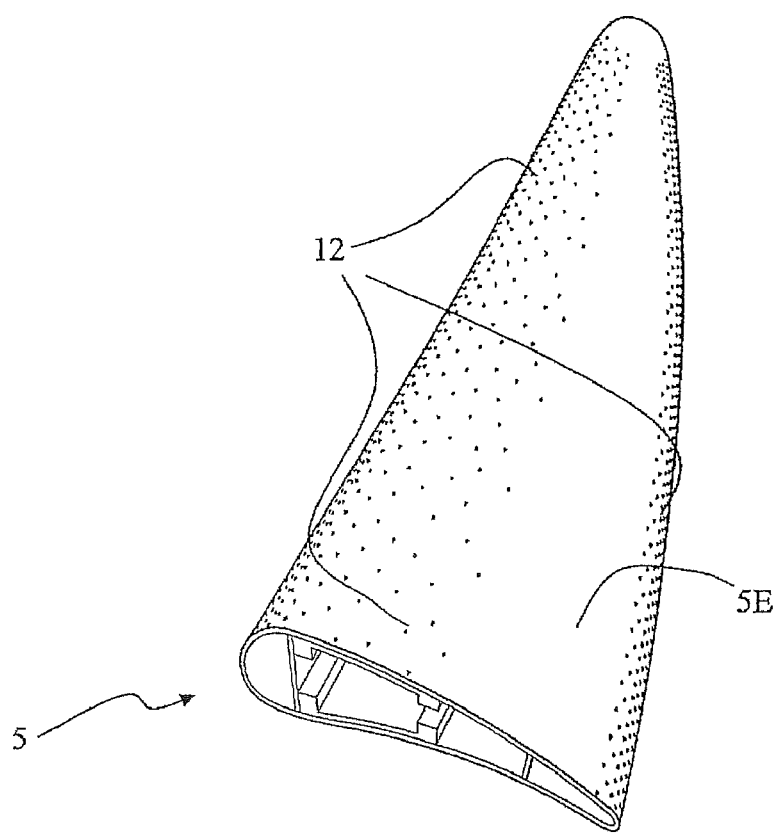
FIG. 2 is a schematic perspective view of the end portion of a blade adapted to implement the method according to the flow chart of FIG. 1.

With reference to FIGS. 2, 3 and 4, the anti-icing system adjustment means comprise interaction elements, designated as a whole by reference numeral 50, which are adapted to interact with the rotor blades 5, in particular with their outer surfaces 5E.

In this case, the interaction elements 50 consist of sheets or foils of a synthetic material, suitable for adhering to the outer surfaces 5E of the rotor blades 5 without affecting the aerodynamic field thereof.

Furthermore, in the example taken into consideration, the adjustment means also comprise engaging elements 51, i.e. peg-shaped elements adapted to engage firmly into at least some holes 12 being present on the outer surface 5E of the blades 5.

The holes 12, when unobstructed, ensure the fluid to effuse from the inside to the outside of the blade, so as to form an air cushion adapted to provide an "anti-icing" and "de-icing" effect on the outer surface 5E of the blade 5.

Said sheets or foils 50 are preferably manufactured in a way so that, when the pegs 51 are in the holes 12, they do not significantly affect and/or change the air flows circulating on the outer surface 5E, thus ensuring a substantially undisturbed aerodynamic behaviour of the blade 5.

In other words and more in general, the adjustment means of the air-effusion anti-icing system include any elements, devices or tools known in the art which are suitable for obstructing at least some of the ejection holes 12 being present on the blade 5, while substantially leaving unchanged the aerodynamic behaviour of the profile.

Thus, for example, the anti-icing system adjustment means may consist of the engaging elements 51 only, provided in the form of resins injected in the holes 12 and then solidified, thus filling the holes 12 and providing continuity of the outer surface 5E of the rotor blade 5. Said resins may also be removed from the holes 12 afterwards, if necessary, e.g. through mechanical operations and/or chemical processes known in the art.

With reference to FIG. 1, further details of the method according to the invention as described above are as follows.

Steps 100 and 102 are carried out by using a computer calculation program, which initially defines the shape, size and surface density of the holes 12 in order to preset environmental conditions, e.g. conditions being particularly critical for icing.

In this manner, a sample blade 5 or "master" blade 5 (step 100A) is created which can operate, when installed in a WECS, in theoretically simulated environmental conditions; for instance, in the most critical conditions for the occurrence of icing on the blades 5, all holes of the blade are open and the air mass effusing through the holes 12 is greatest.

Once the "master" blade 5 has been defined, the calculation code is executed by inputting the variables of the site where the WECS is to be installed; the calculation code will then output how many and which holes 12 of the "master" blade 5 must be obstructed by the adjustment means, i.e. by the interaction elements 50 and/or by the engaging elements 51. The application of said interaction elements 50 and/or engaging elements 51 will then be followed by the anti-icing system testing according to step 104 of the method.

With reference to step 112, the shape and/or location of the interaction elements 50 and/or of the engaging elements 51 are changed in accordance with the results as experimentally obtained. For example, the engaging elements 51 are removed from those holes 12 in the proximity of which icing is observed, and/or from those holes 12 which are located immediately upstream of the region where icing is observed, in relation to the air flowing to the blade 5.

Subsequent on-site tests will either confirm the configuration of the "master" blade 5 or will show the need to modify it, so that the same configuration can be changed very easily by acting on the adjustment means, i.e. the interaction elements 50 and/or the engaging elements 51; advantageously, this adjustment can be carried out on site with minimal resources.

For example, during the on-site test ice may occur on obstructed outer surfaces 5E, thus making it necessary to open the obstructed holes 12 in the concerned area and/or the holes 12 upstream of it, in relation to the air flow lapping the "master" blade 5.

Also, the need may arise to obstruct additional holes 12 in areas not subject to icing, thereby obtaining the advantage of giving a higher enthalpic content to the flow effusing from other holes 12 in areas which are more at risk of icing, thus increasing the anti-icing effect.

Thus, even supposing that calculation codes are applied which do not define parameters representing the best solution as to how many and which holes 12 are to be obstructed, the use of the adjustment means, i.e. the interaction elements 50 and/or the engaging elements 51 as described and illustrated, proves to be advantageous for the effectiveness and simplicity of implementation of the method according to the present invention. As a matter of facts, said adjustment means are clearly easy and inexpensive to manufacture, shape, locate and to apply to the outer surfaces 5E of the blades 5.

The implementation of the method is therefore advantageously simple, relatively cheap and flexible, while providing an actual and effective adjustment of the anti-icing system in accordance with its installation site, in particular through a suitable preparation of the blades 5.

Advantageously, the method according to the invention allows to preserve the fluidodynamic behaviour of the blade 5 fitted with the engaging elements 51, while at the same time obstructing the air flow through those holes 12 where it is not necessary to obtain a "de-icing" and "anti-icing" effect by effusion on the blade 5, thus increasing the enthalpic content of the air effusing from the areas most subject to icing, such as, for example, the area of the leading edge of the blade section from ⅔ to ¾ of its overall length. Thus, the air outflow will have a higher energy content and a higher speed in those areas where the anti-icing effect is needed most.

Another advantage of the invention is the definitive elimination of WECS shut-off times, typically due to the necessity of removing solid residues accumulated on the rotor blades 5.

In short, the practical implementation of the method according to the invention requires only two tools: 1) a "master" blade 5 and 2) a calculation code adapted to define the configuration of a rotor blade 5 and of any adjustment means, interaction elements 50 and/or engaging elements 51.

Advantageously, for the example as chosen to represent an anti-icing system using the surface air effusion technology, in particular the one called RIMETech, a calculation code or program named TREWICE is used, which is executed by a suitable computer. The TREWICE program assigns the locations and characteristics of the outer surfaces 5E of a rotor blade 5 which benefit from air effusion. More in particular, once the site variables and the rotor variables (machine and mixed variables) have been assigned, it determines number and distribution of the holes 12 on the outer surface 5E of the blade 5, and the fluidodynamic parameters of the effusing air, such as mass flow rate, temperature and pressure.

The code then carries out a pre-sizing of the anti-icing system, and in particular of the rotor blade 5, thus allowing to find those areas of the blade 5 which should be concerned by hot air effusion.

According to the method of the present invention, the blade 5 thus obtained is then transported to the site and applied to the wind rotor. The assembled wind rotor is then tested for some time in order to evaluate the effectiveness of the pre-sizing parameters. In the event that icing occurs unexpectedly in unprotected regions, i.e. where no effusive protection is provided through holes 12, it will be possible to take the necessary measures on site by removing the seals from some holes 12. In this manner, a new configuration of holes 12 is obtained on the blade 5, which will then be subjected to further testing.

As better described and detailed below, the use of a calculation code, in particular of the program TREWICE, advantageously reduces the need for on-site adjustments to a very small extent. The flow chart of the calculation code, in particular of the program TREWICE, is shown and described in FIG. 5.

The program TREWICE calculates the temperature of the outer surface 5E of a wind turbine blade 5 in accordance with preset atmospheric and operating conditions of the wind turbine.

The temperature distribution on the outer surface 5E can be calculated for a permeable or impermeable wall, i.e. for a solid wall or an effusive holed wall. The temperature value is assigned to each point of the blade 5 according to a specific anti-icing strategy chosen beforehand. This strategy may provide for the complete evaporation of the water intercepting the profile, or else for keeping it in the liquid state on the whole outer surface 5E.

For an impermeable wall, i.e. without occurrence of air effusion through holes 12, the calculation code or program calculates the flow rate of the air circulating in the channels inside the blade 5 and the temperature of said air which are necessary for keeping the outer surface 5E in the temperature conditions as prescribed by the anti-icing strategy.

For a permeable wall, i.e. with occurrence of air effusion through holes 12, the calculation code calculates the flow rate of the air circulating inside the blade 5 as well as the flow rate and the thermo-fluidodynamic conditions of the air effusing in certain points of the outer surface 5E. Such effusion is necessary for forming an air cushion on the outer surface 5E of the blade 5 and for keeping it in the prescribed temperature conditions.

The balances of mass and heat on the outer surface 5E of the blade 5 are calculated by also taking into account the flow rate of the air effusing from the blade 5 and the conditions thereof. These additional contributions are determined by specifying also the geometrical characteristics of the holes 12, which in fact determine the conditions of outflow, velocity, pressure and enthalpy concerning the effusing air. The result of the mass balance and heat flows provides the local outer temperatures of the blade 5.

At this point, an iterative, semi-automatic, evolutionary-type minimization procedure is started for updating the characteristics of the effusion system, i.e. distribution and geometry of the holes 12, flow rates and temperatures.

The iterative procedure includes a target function to be minimized, which may be any cost function based on flow rate, temperature of the blade 5, and number and density of the holes 12.

More in detail, the calculation code comprises the following structural modules, which are implemented through portions of software code.

Figure 5:
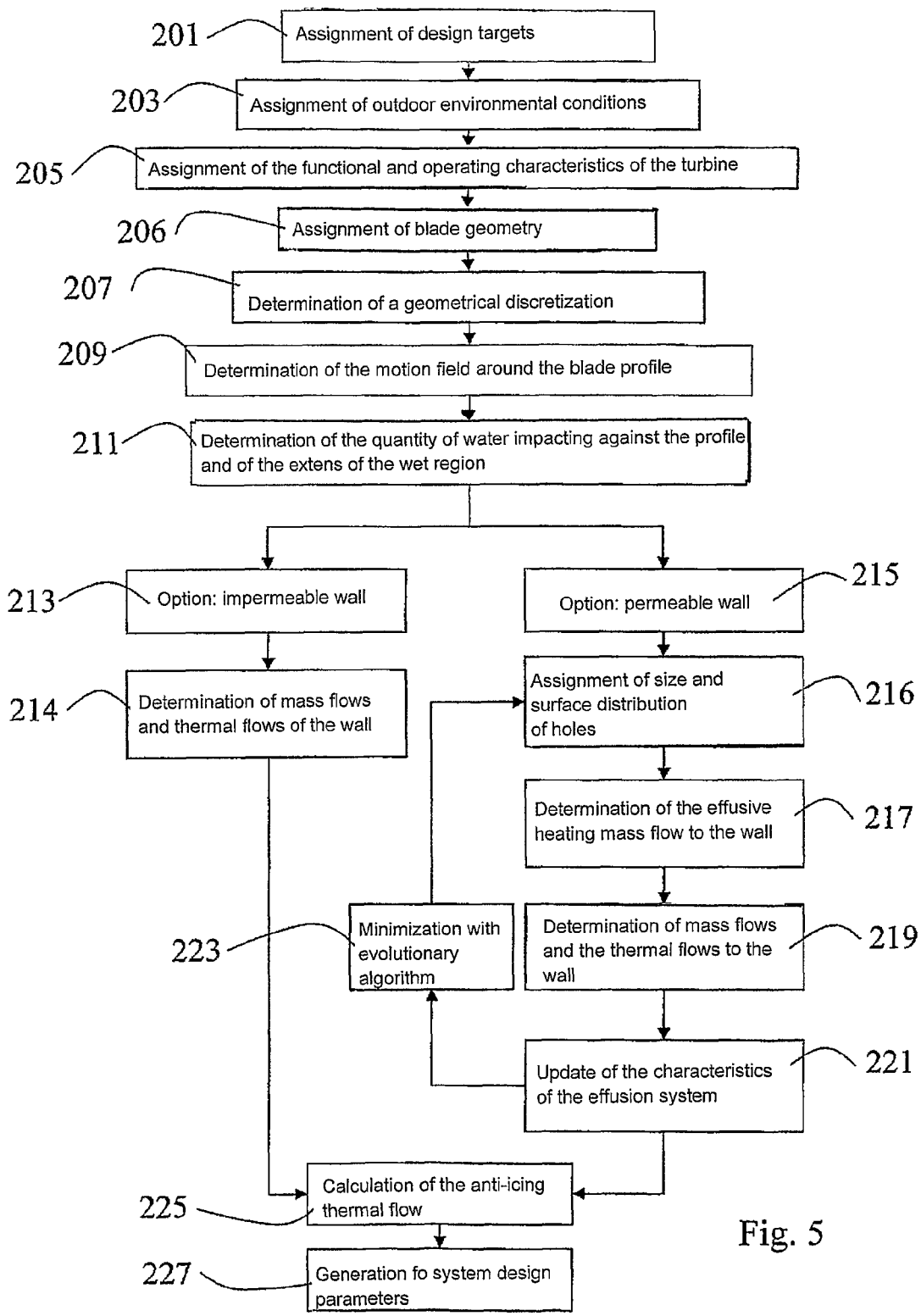
FIG. 5 is a flow chart of a computer program adapted to determine the configuration of a rotor blade in accordance with the method of the present invention.

Still with reference to FIG. 5, a first portion of said structural modules is common to the calculation of both a permeable wall and an impermeable wall of a rotor blade, and comprises:
  assignment of design targets (step 201), the input parameters being:
    assignment of an anti-icing strategy, e.g. a so-called "running wet" strategy, which determines a calculation on wet surfaces
    minimum temperature of the outer surface
    cost function to be minimized
  assignment of external environmental conditions (step 203), the input parameters being:
    external air static pressure
    external air static temperature
    wind speed distribution (undisturbed)
    Weibull's shape parameter
    Weibull's scale parameter
    external air water content
    external air relative humidity
    mean drop size
    compound probability of temperature, water content and mean drop size events
  assignment of the functional and operating characteristics of the turbine (step 205), the input parameters being:
    revolution speed per wind speed,
    cut-in speed
    rated speed
    cut-out speed
    power curve
    electric generator efficiency
    pitch and revolution speed adjustment curve
    number of blades
  assignment of blade geometry (step 206), the input parameters being:
    length
    type of blade profile
    planform (distribution of chord as a function of radius, distribution of profile thickness)
    attack angle as a function of radius
    coupling angle as a function of radius
    wall thickness as a function of radius and chord
    internal layout
    material
    non-negotiable geometrical constraints A second intermediate portion of said structural modules is also common to the calculation of both a permeable wall and an impermeable wall of a rotor blade, and comprises:
  determination of the geometrical discretization (step 207)
  determination of the motion field around the blade profile (step 209)
  determination of the quantity of water impacting against the profile and of the extent of the wet region (step 211).

At this point, the calculation code uses a third intermediate portion of said structural modules, which is different depending on whether the calculation concerns a rotor blade permeable or impermeable wall.

For a permeable wall (step 215), said third portion comprises:
  assignment of the size and surface distribution of the holes (step 216), the input parameters being:
    hole start radial station
    number of rows of holes
    total number of holes
    hole diameter
    spacing relations along the radius
    spacing relations along the curvilinear coordinate
    main heating air flow rate
    main heating air pressure
    main heating air temperature
  determination of the effusive heating mass flow to the wall (step 217)
  determination of mass flows and thermal flows to the wall (step 219)
  update of the characteristics of the effusion system (step 221) through a minimization function with evolutionary algorithm (step 223)

For an impermeable wall (step 213), said third portion comprises instead:
  determination of mass flows and thermal flows to the wall (step 214).

Finally, said structural modules also comprise a fourth portion, which is again common to the calculation of both a permeable wall and an impermeable wall of a rotor blade, said fourth portion comprising:
  calculation of the anti-icing thermal flow (step 225)
  generation of system design parameters (step 227)

The output parameters generated by the calculation code are at least the following:
  total number of holes
  hole diameter
  surface distribution of the holes air flow rate through the holes
main hot air flow rate
supply pressure
supply temperature
temperature distribution on the outer blade surface
thermal power More in detail, the calculation code assists the designing of the air-effusion anti-icing system according to the following integrated procedure as subdivided into several levels.

Level 1

The calculation code is executed for all typologies of blade 5 adopted by a certain industrial production, which typically utilize a family of profiles, e.g. five-digit NACA or SERI profiles, and differ geometrically from one another in several parameters, such as blade length, warping, thickness distribution along the radius. Each of these blades 5 forms one set normally made up of two or three blades, which originates a wind rotor whereto certain functional conditions are associated, such as revolution speed and profile attack angle per revolution speed.

When possible sets of environmental conditions are inputted and assigned, also including those which are extremely critical for the occurrence of icing, the calculation code generates those characteristics of the system of holes 12 which minimize a certain function, called target function.

For every WECS, each rotor is characterized by a set of main geometrical design parameters of the blade 5 of the effusion system, such as diameter, distribution and number of holes 12. These geometries are fixed and represent the best compromise for an anti-icing system suitable for a plurality of sites. For example, the calculation code allows to obtain the generic value of the diameter of the holes 12, which might be greater on the leading edge of the blade 5 and then decrease toward the trailing edge of the blade 5, with the rows of holes 12 wider apart, i.e. a decreasing hole density.

The calculation code also provides a temperature range for the effusing air as well as a flow rate range which will allow to adapt the system to specific atmospheric conditions.

Level 2

Based on the results of level 1, a "master" blade 5 is manufactured for each rotor, i.e. a blade which can ensure that no icing will occur even in the most critical environmental conditions. Said "master" blade 5 is provided with holes 12 having geometrical characteristics defined by the calculation code depending on the thermal power required and on the air supply pressure in the blade 5. At this point, a family of holed blades 5 are available which are suited to the different atmospheric conditions in the respective installation sites.

Level 3

For a generic work order, which requires a certain wind turbine to be installed on a specific site, it is necessary to verify the quality of the available atmospheric data. If such data is sufficiently accurate, the calculation code, in particular the TREWICE program, will be used again for the detailed project. This will lead to define which regions of the "master" blade 5 are to be prearranged with holes 12 for this specific case, i.e. for that specific site where the WECS will operate. In particular, the calculation code identifies geometrical and functional anti-icing system characteristics making up a subset of general ones as defined at level 1). Consequently, the "master" blade 5 will be prearranged by sealing some holes 12 and leaving other holes 12 open. If no site data is available, level 3 will be omitted and the "master" blade 5 will be sent to the site with a configuration being as general as possible.

Level 4

The blade 5 prearranged at level 3 is applied to the rotor of the WECS and is tested on site for some time, in order to evaluate the pre-sizing parameters effectiveness. If icing occurs in regions where the calculation code would have provided no effusive protection, it will be possible to take the necessary measures on site by removing some sealings, thus letting air flow out. It will also be possible to seal some holes 12, if the concerned surface shows physical conditions typical manifesting the absence of the risk of icing, as detailed below.

First, the blade is subdivided into keystones along its length, and each keystone is fitted with a particular system for detecting the risk of icing. Said system comprises a pair of weather sensors, in particular a temperature sensor $S_T$ and a rain sensor $S_R$, located on the outer surface of the blade as shown in FIG. 3. More in particular, both sensors are secured to the blade close to each other, upstream of a hole 12 in relation to the fluid flow lapping the blade in operating conditions, preferably near to the leading edge of the corresponding profile. Also, these sensors are so positioned as to be lapped by the hot flow coming out of said hole as well as of any other upstream holes.

In this system, the sensors are connected to a controller which can process the information supplied by the sensors in order to signal a possible risk of icing, or else to indicate when icing is far from occurring. This latter evaluation, for example, is made when, during the on-site test of the rotor blade, the temperature sensor indicates a temperature $T \geq Tcr$ and the rain sensor indicates the presence of drops of water on the surface, or when $T \leq Tcr$ and the rain sensor does not signal the presence of water particles. Tcr designates a critical threshold temperature to determine the possibility of icing on the surface downstream of the pair of sensors, this temperature being set on the basis of risk analyses taking into account icing conditions (glaze or frost) and the reading accuracy of the temperature sensor used. For example, a conservative value of Tcr may be 3° C., while less conservative values may go further down to 1° C.

Therefore, when the above-mentioned conditions take place, it is possible to obstruct the previously open holes 12, thus experimentally bringing about a further possibility of adaptation of the blade according to the method of the present invention. It is important to point out that, since the sensors are located near to the leading edge of the fluid flow, i.e. where pressure is highest, if no icing conditions occur in this area, they will not occur in the whole keystone either, so that all holes of a certain keystone can be opened.

Advantageously, the occurrence of the system comprising two surface sensors for detecting the risk of icing should be intensified in those longitudinal blade sections where it is already known that the risk of icing is high, typically in the section from ⅔ to ¾ of the overall length of the blade.

Level 5

At the end of the level 4 process, the definitive configuration of the blade 5 of a certain WECS fitted with a preset anti-icing system is established and adapted to or customized for its specific installation site. It follows that it will now be possible to manufacture the final blade 5 or to adapt the "master" blade according to the level 3 and 4 as above.

Practical Example of Embodiment of the Method

Below is a practical example of embodiment of the method according to the invention, more in particular of the implementation of a part of the method by means of a calculation code, in particular the program TREWICE, by going through the various process levels as described above.

In particular, below are listed the input parameters to be assigned to the calculation code, with the respective values and units.

Assignment of design targets (step 201)
Assignment of the anti-icing strategy: "running wet"
  minimum temperature of the outer surface: +1° C.
  cost function to be minimized: Target F=min (Ta, Test>Tmin)
Assignment of external environmental conditions (step 203):
  external air static pressure: 10,000 Pa
  external air static temperature: 271 K
  wind speed distribution (undisturbed): 0-20 m/s
  Weibull's shape parameter (K): 1.6 (dimensionless)
  Weibull's scale parameter (C): 8 m/s
  external air water content: 0.4 g/m3
  external air relative humidity: 0.98 (dimensionless)
  mean drop size: 20 μm
Assignment of the functional and operating characteristics of the turbine (step 205):
  revolution speed per wind speed: ω=f(V), measured in Hz
  cut-in speed: Vcut,in, measured in m/s
  rated speed: Vrated, measured in m/s
  cut-out speed: Vcut,out, measured in m/s
  power curve: P=f(V), measured in Watt
  electric generator efficiency: ηel=f(ω) (dimensionless)
  pitch and revolution speed adjustment curve: β=f(ω, P), measured in degrees
Assignment of blade geometry (step 206):
  length: 30 m
  type of blade profile: NACA 4414xx=f(R)
  planform—distribution of chord as a function of radius: C=f(R), measured in meters
  planform—distribution of profile thickness: t/c=f(R), measured in meters
  attack angle as a function of radius: α=f(R), measured in degrees
  coupling angle as a function of radius: θ=f(R), measured in degrees
  wall thickness as a function of radius and chord: sp=f(R, s/c), measured in m
  internal layout: internal dimensions
  material and respective physical characteristics: GFRP (Glass Fiber Reinforced Plastic)
  non-negotiable geometrical constraints: to be specified
Calculation of the characteristics of the anti-icing system according to known routines for thermal-fluidodynamic and conjugated thermal exchange calculations in the presence of two-phase fluids (step 216), for example:
  number of rows of holes: pressure surface 5, vacuum surface 3
  total number of holes: 2,250
  hole start radial station: 80 (dimensional)
  hole diameter: 0.01 m
  spacing relations along the radius: 0.1 m
  spacing relations along the curvilinear coordinate: 0.1 m
  main heating air flow rate: 1 kg/s
  main heating air pressure: 101,700 Pa
  main heating air temperature: 315 K
FIG. 6 shows a schematic representation of the setup of a "master" blade 5 obtained according to the level 2 process, i.e. after taking into consideration different configurations according to the level 1 process.

The configuration of the "master" blade 5 is characterized by a certain distribution, density and diameter of the holes 12 (represented by blank circles) being present in different stations of the blade 5 taken along the blade length, as well as by different values of the curvilinear abscissas of the profiles of the blade 5, on the respective pressure and vacuum sides. In this representation several stations, which would be repeated unchanged, have been omitted for simplicity's sake. Since the blade shown is a "master" blade, all the holes 12 in the configuration are unobstructed.

FIG. 7 shows a schematic representation of the previous "master" blade configuration modified by the calculation code according to a level 3 implementation, i.e. by taking into account the environmental parameters of a specific site. It should be noted that, unlike the "master" blade, the holes in stations 80 to 100, shown as solid circles, are obstructed.

FIG. 8 shows a possible final configuration of the "master" blade obtained by carrying out a level 4 process, when the blade, once modified as suggested by the calculation code on the basis of the site parameters, is actually tested and verified on site. FIG. 9 indicates the output parameters, i.e. the final implementation parameters, of the blade 5 according to a possible final implementation configuration of level 3, as shown in FIG. 7, by also specifying the total number of holes 12 in the various stations:
  hole diameter: 0.01 m
  surface distribution of the holes, wherein the acronym "S.P." designates the pressure surface and the acronym "S.D." designates the vacuum surface:
    Station 179-180→S.P.
    Station 179-180→S.D.
    Station 178→S.P.
    Station 178→S.D.
    Station 177→S.P.
    Station 177→S.D.
    Station 174-176→S.P.
    Station 174-176→S.D.
    Station 102-174→S.P.
    Station 102-174→S.D.
    Station 101→S.P.
    Station 101→S.D.
  total number of holes: 26 (179–180)+21(178)+17(177)+32(174–176)+936(102–174)+12(101)=1,044
  hole start radial station: 101
  spacing relations along the radius: 0.1 m
  spacing relations along the curvilinear coordinate: 0.1 m
  main heating air flow rate/blade: 0.7 Kg/s
  main heating air pressure: 102,000 Pa
  main heating air temperature: 310 K Finally, FIG. 10 shows a summary graphic which compares the surface temperature distribution on a generic section of an impermeable-wall blade, designated by a continuous line, with that one as obtained on a similar section of a blade made by using the effusion technology named RIMETech, designated by a dashed line. It can be noted that the effusion technology advantageously allows to have the outer blade surface become para-isothermal, in particular having a temperature of 0° C. in the critical point of the leading edge concerning the upper profile and a downstream temperature distribution showing values always above 0° C. but lower than those corresponding to the same situations on an impermeable surface.

This optimization minimizes the thermal power to be supplied to the fluid, and consequently also the operating costs of the WECS using the system according to the invention. The thermal power and the effusing fluid temperature required for generating the para-isothermal surface are moderate, thus advantageously allowing to use only the thermal power dissipated by the electric generator located in the WECS, without needing additional thermal power subtracted from that generated by the WECS.

It is clear that those skilled in the art may conceive several variations applicable to the above-described example of the method according to the invention or to the rotor blades, comprising interaction and/or engaging elements, used for implementing said method; likewise, it is also clear that, in a practical implementation of the invention, details as illustrated herein may have different shapes or may be replaced with technically equivalent ones.

For example, the method according to the invention may be implemented by testing the blades 5, rather than on the actual installation site, on an artificially prepared test site, with weather conditions reproduced as necessary, in particularly according to the conditions being present on the installation site.

As an alternative, the blades 5 and the WECS may be reproduced in scale, and all the testing may be carried out in suitable sized test facilities or wind tunnels. Advantageously, these solutions will provide additional cost and time savings when implementing WECS by using the method according to the invention, in that it will no longer be necessary to bring the WECS and its blades to the installation site before their final installation, the process for adapting the blade to the site being carried out entirely in a wind tunnel.

The invention claimed is:

1. A method for implementing a Wind Energy Converting System (WECS) on a "de-icing" or "anti-icing" system effusing a fluid flow through a plurality of holes (12) obtained on at least a portion of the outer surface (5E) of a rotor blade (5), said holes (12) being so provided as to create an air cushion from the fluid effusing from the blade (5), such air cushion being adapted to interact with the fluid flow lapping the outer surface (5E), said method comprising the steps of:
  a) prearranging a wind rotor comprising a plurality of blades (5), each blade having a blade surface (5E), an anti-icing system, and means (50, 51) for adjusting the anti-icing system wherein, once a "master" blade (5) has been defined, configuring said adjustment means (50, 51) by evaluating site parameters relating to the WECS installation site, wherein the configuring said adjustment means comprises the configuration of interaction elements (50) or engaging elements (51) working together with said plurality of holes (12) in order to obstruct the air flow from said holes (12);
  b) installing the prearranged wind rotor on a test site;
  c) carrying out at least one operation test of the wind rotor, in substantially critical icing conditions for the location where the WECS is to be installed;
  d) detecting parameters right on the blade surfaces useful for determining the presence of ice on the blades (5), such as temperature and humidity being present on the blade surfaces, through suitable sensors;
  e) adjusting the anti-icing system through its adjustment means, if ice is detected, and
  f) repeating the previous steps a)-e) until parameters are detected which indicate that no ice is present on the surfaces of the blades installed on the test site.

2. The method according to claim 1, wherein step a) comprises a calculation for configuring the anti-icing system and for defining the adjustment means (50, 51).

3. The method according to claim 2, wherein said calculation is carried out on the basis of data relating to site variables of the place where the WECS is intended to operate.

4. The method according to claim 2, comprising the steps of:
  assignment of design targets;
  assignment of site conditions or outdoor environmental conditions;
  assignment of the functional and operating characteristics of the turbine and of the geometry of the blade (5);
  determination of a discretization of the geometrical shape of the blade (5);
  determination of the motion field around the wing profile of the blade (5);
  determination of the quantity of water impacting against the profile of the blade (5) and definition of the extent of the wet region;
  implementation of operations relating to an impermeable wall, comprising the steps of:
    determination of mass flows and thermal flows to the wall;
    calculation of the anti-icing thermal flow;
    definition of anti-icing system design parameters relating to impermeable blade surface walls;
  implementation of operations relating to a permeable wall, i.e. with air effusing from the outer surface (5E) of the blade (5), comprising the steps of:
    assignment of the size and surface distribution of the holes (12);
    determination of the effusive heating mass flow to the wall;
    determination of mass flows and thermal flows to the wall;
    update of the characteristics of said "de-icing" or "anti-icing" system, i.e. assignment of new sizes and surface distributions of the holes (12) by minimizing a target function;
    calculation of the anti-icing thermal flow, and
    definition of system design parameters relating to the permeable outer wall (5E) of the blade (5).

5. The method according to claim 4, wherein the operation for updating the characteristics of said "de-icing" or "anti-icing" system, i.e. the assignment of new sizes and surface distributions of the holes (12) by minimizing a target function, is implemented by using an evolutionary algorithm.

6. The method according to any of claims 1 to 3, wherein step a) comprises an operation for defining a "master" blade having a certain anti-icing system configuration, said configuration being calculated based on the most critical site conditions for the occurrence of icing.

7. The method according to claim 1, wherein said step of configuring the adjustment means comprises the configuration of interaction elements (50) and/or engaging elements (51) associated with the outer surface (5E) of the rotor blade (5).

8. The method according to claim 1, wherein the adjustment of the anti-icing system through said adjustment means (50, 51) comprises the removal or modification or replacement or variation of at least some of said interaction elements (50) or said engaging elements (51) which obstruct at least a portion of said plurality of holes (12).

9. The method according to claim 8, wherein the adjustment of the anti-icing system through said adjustment means (50, 51) is carried out on those holes (12) which, after the on-site test of step c), have turned out to be near the area where ice has been detected.

10. The method according to claim 9, wherein the adjustment of the anti-icing system through said adjustment means (50, 51) is carried out on the holes (12) upstream of the area where ice has been detected, in relation to the motion of the air lapping the outer surface (5E) of the blade (5).

11. The method according to claim 8, wherein step d) comprises an operation for detecting the risk of icing and, if such risk is found to be remote, the removal or modification or replacement or variation of at least some of said interaction elements (50) or said engaging elements (51) in order to open at least a portion of said plurality of holes (12).

12. The method according to claim 11, wherein the operation for detecting the risk of icing is carried out by using a detection system comprising a pair of weather sensors, chosen among a group including temperature sensors, humidity sensors, pressure sensors and rain sensors, located on the outer surface of the blade close to each other and upstream of a hole (12) in relation to the fluid flow lapping the blade in operating conditions, near to the leading edge of the blade, said sensors being so positioned that they are not lapped by the hot flow coming out of the hole (12) and of any other upstream holes.

13. The method according to claim 12, wherein an evaluation of the risk of icing is carried out when one of the pair weather sensors reads a temperature $T \geq Tcr$ and the other of the pair of weather sensors indicates the presence of drops of water on the surface, or when $T \leq Tcr$ and the other sensor detects no water particles, Tcr designating a critical threshold temperature to determine the possibility of icing on the surface downstream of the pair of weather sensors.

14. The method according to claim 1, wherein the operation for configuring an anti-icing system and for defining adjustment means (50, 51) for adjusting said anti-icing system is carried out by taking into account variables of the test and installation sites, machine variables relating to the WECS, and mixed variables, i.e. variables depending on both weather and machine conditions.

15. The method according to claim 1, wherein the on-site operation test of the WECS according to step c) is carried out in a test room or in a wind tunnel, the WECS being provided as a scale model.

16. The method of claim 1 implemented as a computer program which can be loaded in the memory of at least one computer.

* * * * *

UNITED STATES PATENT AND TRADEMARK OFFICE
CERTIFICATE OF CORRECTION

PATENT NO. : 8,398,368 B2  
APPLICATION NO. : 12/303068  
DATED : March 19, 2013  
INVENTOR(S) : Lorenzo Battisti Page 1 of 1

It is certified that error appears in the above-identified patent and that said Letters Patent is hereby corrected as shown below:

In the Claims

Col. 15, line 13 after "pair" insert --of--.

Signed and Sealed this  
Twenty-fifth Day of June, 2013

Teresa Stanek Rea  
*Acting Director of the United States Patent and Trademark Office*